United States Patent Office 3,329,563
Patented July 4, 1967

3,329,563
INSECTICIDAL EMULSIONS
Kiyoshi Sotome, 297 Setagaya 1-chome, Setagaya-ku, Tokyo, Japan
No Drawing. Filed Feb. 13, 1963, Ser. No. 258,139
8 Claims. (Cl. 167—42)

The present invention relates, in its broadest scope, to insecticidal emulsions and the production thereof and of insecticidal packaging materials utilizing them.

Many investigations have hitherto been conducted in regard to insecticidal emulsions and the production thereof. For example, packaging materials which are coated or permeated with an organic solution of insecticides such as naphthalene have been used. However, such packaging materials encountered many difficulties in certain physical characteristics imparted thereto.

We have succeeded in producing stable insecticidal emulsions consisting essentially of organic chlorine compounds and in producing excellent packaging materials by causing such organic chlorine compounds to adhere to papers, cartons and textiles in such a manner that the resulting emulsions are added during stock preparation or they are treated with the resulting emulsions as a secondary working.

The present invention is more particularly directed to a novel method of producing stable insecticidal emulsions consisting essentially of, as insecticidal compound, 1,2,3,4,10,10-hexachloro - 1,4,4a,5,8,8a - hexahydro-1,4-endo, exo-5,8-dimethanonaphthalene (I), 1,2,3,4,10,10-hexachloro - 1,4,4a,5,8,8a - hexahydro-1,4-endo,endo-5,8-dimethanonaphthalene (II) which is endo-endo isomer of (I), 1,2,3,4,10,10-hexachloro - 6,7 - epoxy-1,4,4a,5,6,7,8,8a - octahydro - 1,4 - endo,exo-5,8-dimethanonaphthalene (III) which is formed by peroxide treatment and 1,2,3,4,10,10-hexachloro - 6,7 - epoxy-1,4,4a,5,6,7,8,8a-octahydro-1,4-endo,endo-5,8-dimethanonaphthalene (IV) which is the endo-endo isomer of (III), and utilizing the stable insectidal emulsions for the production of insecticidal packaging materials.

Of the organic chlorine compounds previously described, (I) is called aldrin, (II) isodrin, (III) dieldrin and (IV) endrin. "Drin reagents" will be employed hereafter in this specification for designating these compounds described, supra.

These compounds, as is widely known, have been employed to kill insects of argicultural crops, fruits and vegetables, and reported to be effective insecticides. The application of these compounds is usually accomplished by spraying as a suspension in an organic solvent or as a dust in dry state. However, packaging materials such as papers, cellophane and metallic foils have not heretofore been treated with these compounds for the purpose of killing insects indirectly.

In accordance with the present invention, very stable emulsions containing aldrin, isodrin, dieldrin and endrin, which are suitable for treating packaging materials, especially papers and cartons, can be obtained. These emulsions may be added directly to a beater in a similar manner as synthetic resin emulsions such as styrene-butadiene and butadiene-acrylonitrile which have been used as beater additives. Therefore, in accordance with the invention, it is possible to produce many papers or cartons having remarkable insecticidal properties on a commercial basis without changing the old plants for the manufacture thereof. Of course the finished papers or pulps may be treated by a usual coater such as a size-press, calender-size and air-knife. Since the emulsion obtained by the present invention is very stable, the emulsion may be used with an inorganic salt, such as clay, calcium sulfate and calcium carbonate.

An object of the present invention is to provide stable insecticidal emulsions, more particularly stable insecticidal emulsions consisting essentially of one or more organic chlorine compounds, such as 1,2,3,4,10,10-hexachloro-1,4,4a,5,8,8a-hexahydro - 1,4 - endo,exo-5,8-dimethanonaphthalene, its endo-endo isomer, 1,2,3,4,10,10-hexachloro - 6,7 - epoxy-1,4,4a,5,6,7,8,8a-octahydro-1,4-endo, exo-5,8-dimethanonaphthalene and its endo-endo isomer.

Another object of the present invention is to provide a method for producing stable insecticidal emulsions consisting essentially of the organic chlorine compounds described above.

Still another object of the present invention is to provide a method for producing insecticidal packaging materials utilizing the stable insecticidal emulsions.

The other objects and merits of the present invention will be clearly understood from the following descriptions.

The stable insecticidal emulsions of our invention can be produced, in general, by dissolving the Drin reagent in an organic solvent at a relatively high temperature and emulsifying the resulting solution in an aqueous solution of a surfactant and phosphate at a relatively high temperature in an emulsifier. The insecticidal packaging materials of our invention can be produced by adding the stable insecticidal emulsion produced as above to the pulp during stock preparation, followed by fixing with aluminum sulfate as in the case of using resin or by applying the stable insecticidal emulsion onto the surface thereof by a size-press or air knife coater.

Typical of the solvents of the Drin reagent suitable for use in producing the stable insecticidal emulsions of our invention are ethylene dichloride, carbon tetrachloride, acetone, benzene and xylene. These solvents may be used either alone or in mixtures. The solubility of each Drin reagent in these solvents is shown in Table 1. (At 26° C.)

TABLE 1

| Solvents | Boiling point, ° C. | Aldrin | Dieldrin | Endrin |
| --- | --- | --- | --- | --- |
| Ethylene dichloride | | 104 | 48 | 53 |
| Carbon tetrachloride | 76.8 | 105 | 38 | 38 |
| Acetone | 56.5 | 66 | 22 | 26 |
| Benzene | 80.1 | 83 | 40 | 37 |
| Xylene | 138.0 | 92 | 38 | 41 |

In order to raise the concentration of the Drin reagent in the solvent, it is preferred to select a solvent having a high boiling point and to dissolve the reagent therein, because the higher the temperature, the greater the solubility of the Drin reagent. For example, xylene is preferably used for aldrin. When using such solvent at 60–70° C., aldrin as much as the solvent may be dissolved. The Drin reagent is thus dissolved at the high temperature (about 60–70° C.) and subjected to emulsification, whereby the emulsion having the high concentration of the effective component can be obtained.

When the solution of the Drin reagent is subjected to emulsification by the use of water, the resulting emulsion tends to be unstable. We have found that this disadvantage can be overcome by the addition of a surfactant thereto, and if a special surfactant is employed, the dispersibility and the plasticity of the emulsion can be remarkably improved. The surfactant suitable for this purpose is one or more of the following alkylaryl sulfonate, alkylphenol sulfonate, aliphatic alkyl sulfate, its amine salt, sulfate oil and ethylene oxide condensate of polypropylene glycol. A particularly interesting emulsification may be carried out by the use of the condensate of ethylene oxide and polypropylene glycol. The condensate of ethylene oxide and polypropylene glycol has a number of combinations as is apparent from the structure $$HO(C_2H_4O)_a(C_3H_6O)_b(C_2H_4O)CH$$

its effect depending on the molecular weight. When the molecular weight is about 2,000, the wettability is increased, and when the molecular weight is above 3,000, the dispersibility and plasticity are increased. Therefore, in spite of the fact that they have similar chemical structures, they show different characteristics in accordance with the molecular weights, which afford simplified means of controlling the emulsification. In the present invention, such surfactant is dissolved in water, and one or more of the following: sodium tripolyphosphate, tetrasodium pyrophosphate and sodium hexametaphosphate are added thereto and the resulting aqueous solution and the organic solution of the Drin reagent are subjected to emulsification in an emulsifier.

The reason for using these phosphates will be understood by the explanation described hereinafter. When the emulsion is added to papers or cartons during the period of stock preparation thereof or the emulsion is applied onto the finished surface thereof, it is necessary to suppress the effect of hard water for the purpose of preventing the lowering of the strength of the papers or cartons. In particular, when resin and the insecticidal emulsion are added to the pulp-slurry as in the former and thereafter fixed on the fibres, the presence of $Mg^{++}$ and $Ca^{++}$ lowers the retention of the pulp fibres and interrupts the sizing effect. These phosphates react with $Mg^{++}$ and $Ca^{++}$ and soften the hard water. The precipitate that is formed by the reaction of the phosphate and hard water may be dispersed enough so that it is not fixed on the pulp fibres by the surfactant present.

The temperature is very important, when the organic solution of the Drin reagent is emulsified in the water containing the surfactant and phosphate. The emulsification at normal temperature results in the crystallization of a part of the Drin reagent, that is in supersaturation, because the dissolution of the Drin reagent is carried out at the relatively high temperature of 60–70° C. as hereinbefore stated, so as to decrease the amount of the oragnic solvent at the emulsification, that is, to raise the effective content of the Drin reagent. However, it is found that if the emulsification is carried out at the relatively high temperature, 60–70° C., the resulting emulsion does not deposit any crystal even at the normal temperature.

In addition, miscellaneous organic substances may be added to the emulsion to give viscosity thereto which prevents the emulsion from falling off, when the packaging materials applied therewith are dried. As these organic substances, one or more of the following are preferably employed, hydroxyethyl cellulose, polyvinyl alcohol and carboxymethyl cellulose. This emulsion can be diluted with water to any concentration.

The following examples are given to further illustrate the present invention and the utility thereof: it is not intended to limit the same to the quantities, and conditions employed. The present invention is not intended to be limited beyond the scope and spirit of the appended claims.

*Example I*

100 kg. of aldrin was dissolved in 90 kg. of xylene at 60–70° C. On the other hand, an aqueous solution of 10 kg. of 1:4 mixture of polypropyleneglycol-ethylene oxide condensate having a molecular weight 2,000 and 3,000 and 1.3 kg. of sodium hexametaphosphate was heated to 60–70° C. To this aqueous solution the aldrin in xylene was added slowly at 60–70° C. in an emulsifier (3,000–5,000 r.p.m.) to be emulsified. After the addition of the aldrin in xylene, stirring was continued for 5–10 minutes and 1.5 kg. of carboxymethyl cellulose dissolved in 298.5 kg. of water was added thereto to give an emulsion containing 20% of aldrin.

If the temperature is lowered during the emulsification, it is necessary to heat with stirring.

*Example II*

The treatment with the emulsion prepared as in Example I during stock preparation.

As a pulp, kraft pulp of needle-leaf trees was used and was beaten in a beater to 35° SR. The addition of the emulsion to the pulp was carried out after 1% of resin was added. Then 3% of aluminum sulfate was added thereto to adhere the emulsion and the resin on the pulp fibres. After the addition of aluminum sulfate the resulting mixture was adequately agitated. When polypropyleneglycol-ethylene oxide condensate was used as a dispersing agent, the foaming of foaming did not occur. The pH of the stock was 4.5 at a flow-box. Papermaking was carried out as usual.

Among some of the physical properties of the resulting paper are the following:

TABLE 2

| | Amount of Drin reagent added (percent) | | | | | |
|---|---|---|---|---|---|---|
| | 0 | 0.05 | 0.5 | 1.0 | 3.0 | 5.0 |
| Basis weight, g./m.$^2$ | 77.6 | 76.5 | 78.2 | 80.1 | 76.4 | 79.2 |
| Stretch, km | 8.43 | 8.51 | 9.31 | 9.11 | 9.10 | 8.34 |
| Tearing strength, g | 123 | 143 | 115 | 130 | 136 | 138 |
| Folding endurance (MIT 1.0 kg.) number | 1,600 | 1,200 | 1,600 | 1,700 | 1,400 | 1,200 |
| Size degree, sec | 42 | 39 | 40 | 41 | 43 | 40 |

The above values were arrived at by testing at 20° C. and 65% relative humidity one month after papermaking.

It is noted, as shown in the above table, that the Drin reagent does not deteriorate the sheet properties and therefore is suited for treating kraft papers for wrapping. In addition, this method has the advantage of making large-scale production possible without changing the usual papermaking plant.

*Example III*

A kraft paper having 80 g./m.$^2$ of basis weight was treated with the emulsion prepared as in Example I by the use of a horizontal size-press and dried as usual "on-machine-coating." The drying degree at the inlet of the size-press was 95% and at the exit was 75%.

After 3 months from the papermaking the physical properties were determined. Table 3 summarizes the properties and compares the cases of coating with the aldrin emulsion and none.

TABLE 3

| | None | Aldrin* |
|---|---|---|
| Basis weight, g./m.$^2$ | 76.6 | 81.5 |
| Bursting strength, kg./cm.$^2$ | 1.59 | 2.22 |
| Tensile strength, kg.: | | |
|   Standard length | 6.35 | 6.78 |
|   Standard width | 2.95 | 3.39 |
|   Moistened length | 0.57 | 0.68 |
|   Moistened width | 0.34 | 0.43 |
| Elongation, percent: | | |
|   Standard length | 1.4 | 2.0 |
|   Standard width | 5.8 | 5.6 |
|   Moistened length | 1.4 | 1.6 |
|   Moistened width | 4.7 | 4.1 |
| Tearing strength, g.: | | |
|   Length | 81.8 | 95.8 |
|   Width | 70.5 | 90.9 |
| Folding endurance (MIT 1.0 kg.) number: | | |
|   Length | 340 | 360 |
|   Width | 59 | 89 |
| Permeability, sec | 54 | 89 |
| Size degree, sec | 26 | 15 |

*The amount of aldrin adhered is 2.0 g. per m.$^2$ as effective content.

*Example IV*

Testing of insecticidal effects using the insecticidal paper made as described in Example III was carried out.

(a) 200 g. of unpolished rice was put into a bag of the kraft paper treated with the emulsion in Example I and sealed. This bag was placed in a glass cylinder (12 cm. diameter, 15 cm. height) and 200 of Sitophilus orygae L were put thereinto. After 5 days of standing at room temperature, their life and death were investigated. Each test was practised as to the insecticidal paper-bag of single (A), double (B) and triple (C). In addition, the comparison with a bag of untreated paper was given.

TABLE 4.—DEATH-RATE OF Sitophilius orygae L (PERCENT)

| Amount of reagent* (g./m.$^2$) | Test No. | (A) Single bag | (B) Double bag | (C) Triple bag |
|---|---|---|---|---|
| 0.5 | 1 | 100 | 100 | 100 |
|  | 2 | 100 | 100 | 100 |
|  | 3 | 100 | 100 | 100 |
|  | 4 | 100 | 100 | 100 |
|  | 5 | 100 | 100 | 100 |
| 0.8 | 1 | 100 | 100 | 100 |
|  | 2 | 100 | 100 | 100 |
|  | 3 | 100 | 100 | 100 |
|  | 4 | 100 | 100 | 100 |
|  | 5 | 100 | 100 | 100 |
| 1.0 | 1 | 100 | 100 | 100 |
|  | 2 | 100 | 100 | 100 |
|  | 3 | 100 | 100 | 100 |
|  | 4 | 100 | 100 | 100 |
|  | 5 | 100 | 100 | 100 |
| 1.2 | 1 | 100 | 100 | 100 |
|  | 2 | 100 | 100 | 100 |
|  | 3 | 100 | 100 | 100 |
|  | 4 | 100 | 100 | 100 |
|  | 5 | 100 | 100 | 100 |
| 0 | 1 | 47.0 | 46.7 | 31.0 |
|  | 2 | 26.0 | 23.9 | 37.5 |
|  | 3 | 45.0 | 21.9 |  |
|  | 4 | 26.0 | 26.3 |  |
|  | 5 | 35.0 | 58.3 |  |

*The amount of aldrin present on a kraft paper of 78 g./m.$^2$ as an effective content.

(b) Five kinds of insects such as Sitophilus orygae L, Necro barubipas De Geer, Ephestica cautella Walker, Dermestes maculatus De Geer, Dermestes ater De Geer and Chibidauia tokyoeusis SASA were respectively put into the bags of the paper treated with the emulsion in Example I with unpolished rice and sealed with a cellophane tape. Each bag was placed in the same glass cylinder as (a). After 5 days, 11 days and 15 days of standing at room temperature, their life and death were investigated. The results are shown in Table 5.

The foregoing examples and specification clearly illustrate the several embodiments of the present invention and the benefits afforded through the utilization thereof.

What is claimed is:

1. A method for producing stable insecticidal emulsions, which comprises dissolving at least one organic chlorine compound selected from the group consisting of 1,2,3,4,10,10 - hexachloro - 1,4,4a,5,8,8a-hexahydro - 1,4-endo,exo - 5,8 - dimethanonaphthalene, 1,2,3,4,10,10-hexachloro - 1,4,4a,5,8,8a - hexahydro - 1,4 - endo,endo-5,8 - dimethanonaphthalene, 1,2,3,4,10,10 - hexachloro-6,7-epoxy - 1,4,4a,5,6,7,8,8a - octahydro-1,4 - endo,exo-5,8-dimethanonaphthalene and 1,2,3,4,10,10 - hexachloro-6,7-epoxy - 1,4,4a,5,6,7,8,8a - octahydro - 1,4-endo,endo-5,8-dimethanonaphthalene in an organic solvent at a high temperature and emulsifying the resulting solution in an aqueous solution of a surfactant and a phosphate selected from the group consisting of tripolyphosphate, tetrasodium pyrophosphate and sodium hexametaphosphate at a high temperature.

2. A method as claimed in claim 1, wherein the organic solvent is selected from the group consisting of ethylene dichloride, carbon tetrachloride, acetone, benzene and xylene.

3. A method as claimed in claim 1, wherein the surfactant is selected from the group consisting of alkylaryl sulfonate, alkylphenol sulfonate, aliphatic alkyl sulfate and polypropylene glycol-ethylene oxide condensate.

4. A method as claimed in claim 1, wherein the temperature is within the range of about 60–70° C.

5. A stable insecticidal emulsion consisting essentially of (a) a member selected from the group consisting of 1,2,3,4,10,10 - hexachloro - 1,4,4a,5,8,8a-hexahydro - 1,4-endo,exo - 5,8 - dimethanonaphthalene, 1,2,3,4,10,10 hexachloro- 1,4,4a,5,8,8a - hexahydro - 1,4 - endo,endo-5,8 - dimethanonaphthalene, 1,2,3,4,10,10 - hexachloro - 6,7 - epoxy - 1,4,4a,5,6,7,8,8a - octahydro - 1,4 - endo,exo - 5,8 - dimethanonaphthalene and 1,2,3,4,10,10-hexachloro - 6,7 - epoxy - 1,4,4a,5,6,7,8,8a-octahydro-1,4 - endo,endo-5,8 - dimethanonaphthalene, (b) a surfactant selected from the group consisting of alkylphenyl

TABLE 5.—DEATH-RATE OF 5 KINDS OF INSECTS (PERCENT)

| Insect | Amount of reagent (g./m.$^2$) | 5 days | 11 days | 15 days |
|---|---|---|---|---|
| Sitophilus orygae L | 2 | 100 |  |  |
|  | 1 | 100 |  |  |
|  | 0.5 | 100 |  |  |
|  | 0.3 | 100 |  |  |
|  | 0.1 | 99 | 100 |  |
|  | 0 | 86 |  |  |
| Necro barubipas De Geer | 2 | 100 |  |  |
|  | 1 | 100 |  |  |
|  | 0.5 | 100 |  |  |
|  | 0.3 | 100 |  |  |
|  | 0.1 | 100 |  |  |
|  | 0 | 90 |  |  |
| Ephestica causella Walker | 2 | 62.5 | 75.0 | 75.0 |
|  | 1 | 50.0 | 62.5 | 62.5 |
|  | 0.5 | 50.0 | 100.0 |  |
|  | 0.3 | 0 | 0 | 40.0 |
|  | 0.1 | 0 | 42.9 | 55.0 |
|  | 0 | 16.7 | 33.3 | 50.0 |
| Dermestes maculatus De Geer, Dermestes ater De Geer | 2 | [1] 50 / [2] 100 |  |  |
|  | 1 | [1] 80 / [2] 100 |  |  |
|  | 0.5 | [1] 50 / [2] 100 |  |  |
|  | 0.3 | [1] 40 / [2] 100 |  |  |
|  | 0.1 | [1] 80 / [2] 100 |  |  |
|  | 0 | [1] 40 / [2] 45 |  |  |
| Chibidauia tokyeusis SASA | 2 | Lived | Lived | Lived |
|  | 1 | Lived | Lived | Lived |
|  | 0.5 | Lived | Lived | Lived |
|  | 0.3 | Lived | Lived | Lived |
|  | 0.1 | Lived | Lived | Lived |
|  | 0 | Lived | Lived | Lived |

[1] Larva.
[2] Imago.

sulfonate, alkylphenol sulfonate, alkyl sulfate, and the ethylene oxide condensate of polypropylene glycol and (c) a phosphate selected from the group consisting of sodium tripolyphosphate, tetrasodium pyrophosphate and sodium hexametaphosphate.

6. A stable insecticidal emulsion consisting essentially of aldrin, polypropylene glycol-ethylene oxide condensate having a molecular weight of 2,000 to 3,000 and sodium hexametaphosphate.

7. A stable insecticidal emulsion consisting essentially of (a) a member selected from the group consisting of 1,2,3,4,10,10 - hexachloro - 1,4,4a,5,8,8a-hexahydro - 1,4-endo,exo - 5,8 - dimethanonaphthalene, 1,2,3,4,10,10-hexachloro - 1,4,4a,5,8,8a - hexahydro - 1,4 - endo,endo-5,8 - dimethanonaphthalene, 1,2,3,4,10,10 - hexachloro-6, 7 - epoxy - 1,4,4a,5,6,7,8,8a-octahydro - 1,4 - endo,exo-5,8 - dimethanonaphthalene and 1,2,3,4,10,10-hexachloro-6,7 - epoxy - 1,4,4a,5,6,7,8,8a - octahydro - 1,4 - endo, endo-5,8-dimethanonaphthalene, (b) an organic solvent, (c) water, (d) a surfactant, and (e) a phosphate selected from the group consisting of sodium tripolyphosphate, tetrasodium pyrophosphate and sodium hexametaphosphate.

8. A method for producing an insecticidal package which comprises adding a stable insecticidal emulsion as claimed in claim 7 to pulp and thereafter adding aluminum sulfate thereto to fix the emulsion on the pulp fibers.

References Cited
UNITED STATES PATENTS

| | | | |
|---|---|---|---|
| 2,717,851 | 9/1955 | Lidov | 167—30 |
| 2,738,791 | 3/1956 | Schur et al. | 167—181 |
| 2,765,233 | 10/1956 | Sarett | 167—38.6 |
| 2,768,181 | 10/1956 | Bellin et al. | 167—42 |
| 3,056,722 | 10/1962 | Trademan et al. | 167—42 |

OTHER REFERENCES

American Dyestuff Reporter, Jan. 28, 1935, pg. 6 (Article by Munter and Bell), (Reprint).

Casey: "Pulp and Paper," 2nd Ec. vol. II, Interscience Pub. Inc., New York, 1960, pages 740–741.

Monsanto Technical Bulletin, No. P–139, July 8, 1949, 5 page pamphlet, pp. 1–5.

Soap and Sanitary Chemicals, July 1950, pp. 39–41 and 82.

ALBERT T. MEYERS, *Primary Examiner.*

GEORGE A. MENTIS, *Assistant Examiner.*